(No Model.)  2 Sheets—Sheet 1.

C. PHILLIPS.
VELOCIPEDE.

No. 457,290. Patented Aug. 4, 1891.

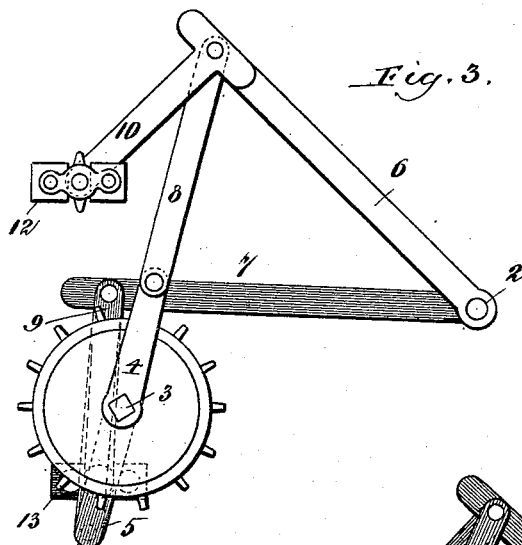
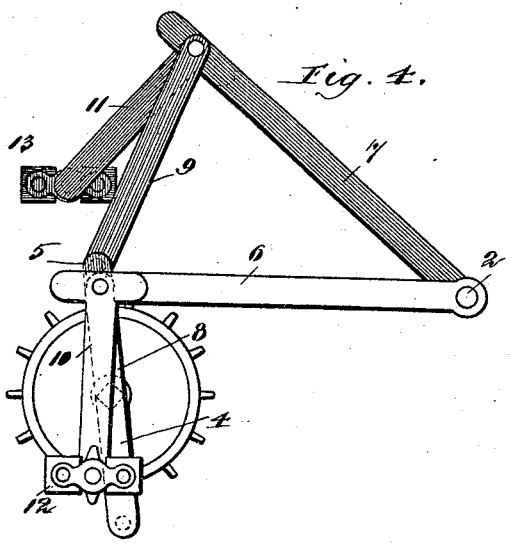
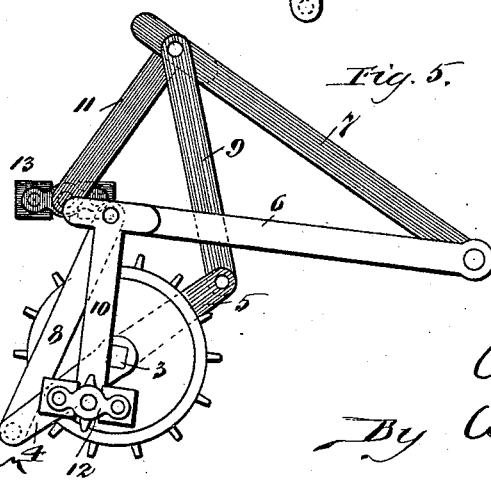

UNITED STATES PATENT OFFICE.

CHARLES PHILLIPS, OF CHICAGO, ILLINOIS, ASSIGNOR OF ONE-HALF TO JOHN THOLEN, OF SAME PLACE.

VELOCIPEDE.

SPECIFICATION forming part of Letters Patent No. 457,290, dated August 4, 1891.

Application filed April 10, 1891. Serial No. 388,376. (No model.)

*To all whom it may concern:*

Be it known that I, CHARLES PHILLIPS, of Chicago, Illinois, have invented certain new and useful Improvements in Pedal-Motors, of which the following is a specification.

My invention relates more particularly to pedal-motors for bicycles and other purposes; and it consists in combining certain levers and bars with a pair of cranks, whereby I overcome the dead-points and secure an increase of power.

In the accompanying drawings I have shown my invention applied to a Safety bicycle.

Figure 1:
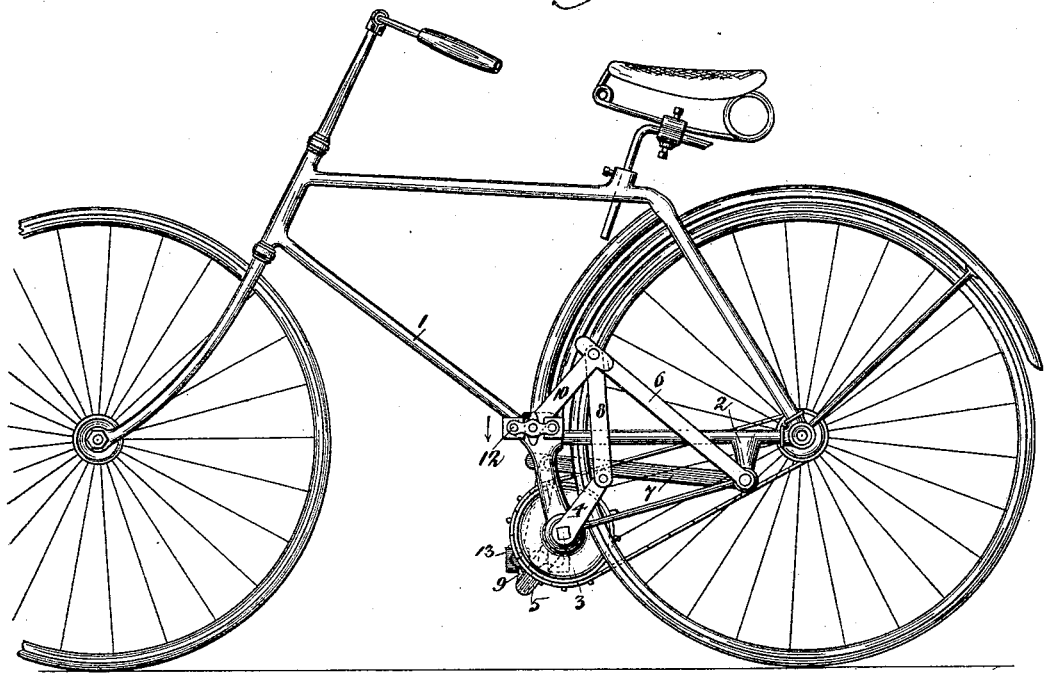
Figure 2:
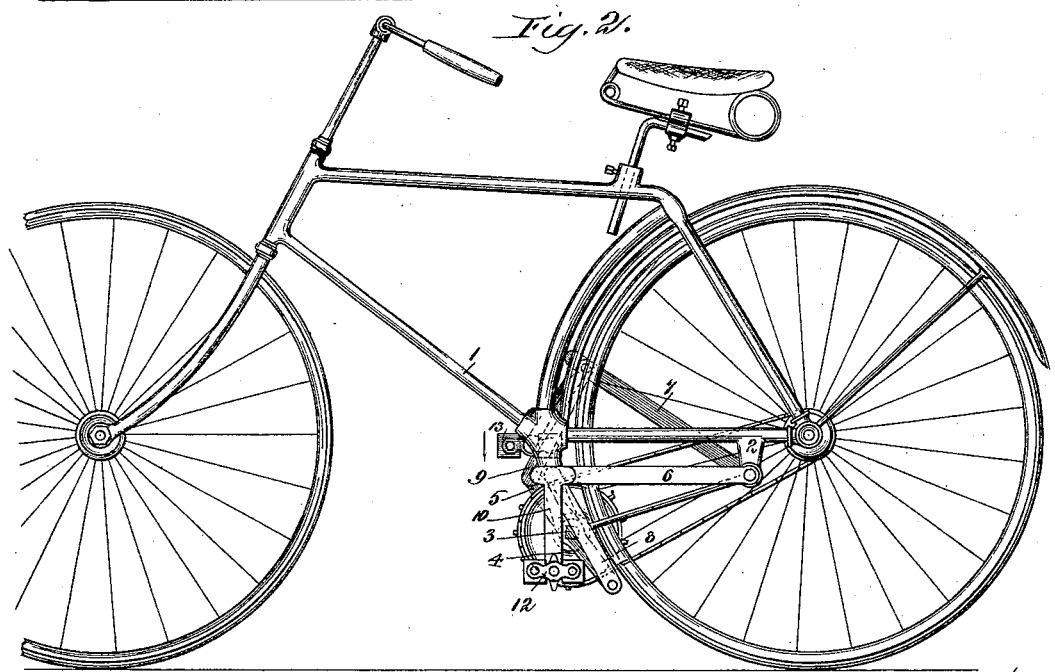

Figure 1 is an elevation from the left side of a bicycle, showing the right-hand crank just completing a downstroke. Fig. 2 is a similar view, but with the right-hand crank just started on its downstroke. Figs. 3, 4, and 5 are diagrams showing different positions of the cranks and connections.

1 is the usual frame of the bicycle.

2 are hangers on the rear wheel-fork.

3 is the crank-shaft, mounted in the usual manner and connected with the wheel by sprocket-pinions and chain, as shown.

4 and 5 are the cranks, set, as usual, diametrically opposed on the shaft.

6 and 7 are radius bars or beams pivoted at their ends to the hangers 2 and connected at their front ends by links 8 and 9 to the cranks 4 and 5, respectively.

10 and 11 are depending arms integral with or rigidly connected to the front ends of beams 6 and 7.

12 and 13 are the treadles, adjustably secured in the usual manner to the arms 10 and 11.

For convenience I have used the even numbers 4, 6, 8, 10, and 12 to designate the members on the left-hand side of the machine and the corresponding odd numbers for those on the right. In practice I have found it best to use the following proportions, viz: I fix the pivotal point 2 at a distance above the level of the crank-shaft equal to three-fourths of the length of the crank-arm. I then make the beams equal in length to the distance from the center of the crank-shaft to the center of the pivotal point 2 and the links 8 and 9 equal to the same distance less the length of the crank-arm. The arms 10 and 11 may be of a length to suit the legs of the rider of the machine.

The manner in which I overcome the dead-points and gain power is illustrated in Figs. 3 and 4. Fig. 3 shows that when one of the cranks, as 4, is on its upper dead-point the other crank has not yet reached its lower dead-point, and Fig. 4 shows that when one of the cranks, as 4, is on its lower dead-point the other one has passed its upper dead-point. In other words, the two cranks are never both on their dead-points at the same time, and there is thus always a margin of power available to drive them over their respective dead-points. The motion of the treadles 12 and 13 being in a small arc of the circle, whose center is at the pivot 2, is substantially a vertical motion even at its upper and lower limits. Hence the weight of the rider and the direct push of his leg is available through the entire stroke to a greater degree than where the treadle moves more or less horizontally, as it does when attached directly to a crank-arm.

I have shown my invention as applied to a bicycle; but it is equally applicable to other machines driven by cranks.

I claim—

1. The combination, substantially as set forth, with the frame and wheels of a Safety bicycle, of a crank-shaft journaled to said frame and connected to the driving-wheel by suitable transmitting mechanism, two cranks oppositely attached to said shaft, beams, as 6 and 7, fulcrumed above the level of said shaft to the frame behind the shaft and extending forward over the shaft, links connecting the cranks with the free ends of the beams, and pedals connected to the free ends of the beams for operating the same.

2. The combination, substantially as set forth, of the cranks oppositely connected to a shaft, the beams fulcrumed above the level of said shaft and extending over the cranks, the links connecting the beams and cranks, the arms 10 and 11, rigid with the beams, and the treadles on said arms.

CHARLES PHILLIPS.

Witnesses:
WM. S. BATES,
A. C. CALKINS.